United States Patent
Ba geri et al.

(10) Patent No.: US 9,657,214 B2
(45) Date of Patent: May 23, 2017

(54) ZERO-INVASION ACIDIC DRILLING FLUID

(71) Applicant: King Fahd University of Petroleum and Minerals, Dhahran (SA)

(72) Inventors: Badr Salem Ba geri, Dhahran (SA); Mohamed Ahmed Mahmoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 234 days.

(21) Appl. No.: 14/337,310

(22) Filed: Jul. 22, 2014

(65) Prior Publication Data

US 2016/0024370 A1   Jan. 28, 2016

(51) Int. Cl.
C09K 8/50   (2006.01)
C09K 8/03   (2006.01)

(52) U.S. Cl.
CPC .............. C09K 8/50 (2013.01); C09K 8/03 (2013.01); *C09K 2208/10* (2013.01); *C09K 2208/30* (2013.01)

(58) Field of Classification Search
CPC ....................................................... C09K 8/36
See application file for complete search history.

(56) References Cited

U.S. PATENT DOCUMENTS

| | | | |
|---|---|---|---|
| 3,750,768 A * | 8/1973 | Suman, Jr. .......... | E21B 21/003 166/295 |
| 4,525,285 A * | 6/1985 | Son .................... | C09K 8/32 507/131 |
| 4,640,361 A * | 2/1987 | Smith ................ | C09K 8/5045 106/38.23 |
| 4,732,213 A * | 3/1988 | Bennett ............. | C09K 8/50 166/275 |
| 5,427,699 A | 6/1995 | Pauls et al. | |
| 6,793,025 B2 | 9/2004 | Patel et al. | |
| 2003/0139298 A1* | 7/2003 | Fu .................... | C09K 8/68 507/200 |
| 2003/0231017 A1* | 12/2003 | Kiesl ................ | E21B 33/1243 324/303 |
| 2009/0181866 A1* | 7/2009 | Reddy ............... | C09K 8/035 507/211 |
| 2013/0000900 A1* | 1/2013 | Kalgaonkar ........ | C09K 8/035 166/279 |
| 2013/0233623 A1* | 9/2013 | Aston ............... | C09K 8/16 175/65 |

FOREIGN PATENT DOCUMENTS

CA   2549515   6/2005

* cited by examiner

*Primary Examiner* — Angela M DiTrani
*Assistant Examiner* — Andrew H Sue-Ako
(74) *Attorney, Agent, or Firm* — Oblon, McClelland, Maier & Neustadt, L.L.P.

(57) ABSTRACT

A drilling fluid system using retarded acid systems such as gelled acid (VES or polymer) and/or emulsified acid to drill carbonate formations (calcite and dolomite). Foamed acid may be used in low abnormal pressure carbonate reservoirs. The drilling fluid system permits drilling a target hydrocarbon-producing formation with zero-invasion of the drilling fluid system. A method for using the drilling fluid system for fluid loss control during drilling operations.

4 Claims, 3 Drawing Sheets

ZERO-INVASION ACIDIC DRILLING FLUID

BACKGROUND OF THE INVENTION

Technical Field

The present invention relates to an acidic drilling fluid system, wherein the system comprises an aqueous acidic solution, a silicate, and a hydro-carbon based isolation fluid, and wherein the system targets a hydrocarbon producing formation with zero invasion. The invention further includes a method of forming a zero-invasion seal on the face of a well bore using the acidic drilling fluid system.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The design of drilling fluid typically includes several additives that are compatible with reservoir fluids and a spectrum of accurately sized solids that can prevent filtration but still provide a thin cake. It is a common practice to enhance the properties of the drilling fluid to control the stability of oil and gas wells as well as to handle its regular function of the drilling fluid. Several ways exist to select drilling fluid additives and their design depends on the way the drilling fluids are executed or the fluid used therein. When these fluids are pumped at pressures higher than the formation pore pressure, the operation is referred to as an overbalance drilling operations. In overbalance drilling operations, one of the drilling fluid's basic functions is to exert hydrostatic pressure over the permeable formation to prevent kicks since the drilling fluid pressure is normally kept above the formation pore pressure. The positive pressure differential between the drilling fluid and formation pore pressure causes the drilling fluid to invade the permeable formation hence the suspended solids in the mud are deposited on the face of the permeable formation to build a filter cake over the formation face, decreasing the rate of filtrate invasion. In addition to the deposition of drilling mud particles on the formation face around the wellbore, the small particles in the mud invade the formation causing damage surrounding the wellbore. Normally, the depth of particles invasion depends on the filter cake permeability, drilling fluid design, and pore size.

Filter cake or mud cake is used conventionally during drilling operations to prevent fluid losses to the formation and to allow good circulation of drilling fluids and suspended cuttings to the surface for removal from the well. Formation of an effective filter cake depends on a very well designed drilling system including mud fluids and additives. The drilling fluid is normally designed for minimum infiltration and solid invasion into the formation. On one hand, the filter cake must withstand high differential overbalance pressures. On the other hand, reduced oil and gas production can result from reservoir damage when a poor filter cake allows deep filtrate invasion. The drilling mud systems undergo comprehensive testing procedures to determine infiltration rate and filter cake properties such as thickness, toughness, slickness and permeability.

Typically, the cuttings formed as a drill removes portions of a formation separate from the drilling mud and are removed using contaminant removal equipment. The effect of introducing formation cutting particles, if not separated, to the drilling fluid during the drilling operation is significant from the point of view of the filter cake's properties. The presence of particles will degrade the performance of the drilling fluid as well as increase the filter cake thickness and permeability. Therefore, forming an effective thin impermeable filter cake still one on the most hard and a challenging tasks of drilling operations.

For long horizontal well sections the filter cake's properties are not constant, heterogeneity effects are often more severe in horizontal wells than in vertical wells because of axial variation of the depth of the damage surrounding the wellbore. This is also significant difficulty that must be overcome in order to improve drilling operations. Although several methods may be employed to overcome this challenge, e.g., use of a smart drilling fluid, there is no existing technique that enables pumping the drilling fluids with good diversion of the fluids. Generally, when a long horizontal formation is drilled, the drilling fluids tend to get deeper invasion in more highly permeable parts of the well. Therefore, the zone with high permeability receives heavy fluid and particle invasion whereas the parts with low permeability receive less damage. On the other hand, in homogeneous formations, especially for long laterals, fluid tends to invade deeper in the heel of the well due to the long time the heel is exposed to drilling. Less invasion occurs in parts of the well away from the heel, e.g., the "toe".

A method and drilling fluid system that can be used to generate quick, thin, uniform and impermeable filter cake layer in horizontal and vertical wells has so far not been available. Moreover, there is a need for improved drilling system compositions and methods of using drilling fluid system that result in zero invasion into a well formation, do not damage the formation, and form a sealing layer only on the face of the formation.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings. One embodiment of the disclosure includes an acidic drilling fluid system.

In another embodiment the acidic drilling fluid system comprises an aqueous acidic solution, a silicate, and a hydrocarbon-based isolation fluid.

In another embodiment the aqueous acidic solution, the silicate and the hydrocarbon-based isolation fluid are in the form of an emulsion.

In another embodiment the emulsion is capable of being broken by contact with a surface of a well bore in a hydrocarbon producing formation.

In another embodiment the broken emulsion initiates interaction between the aqueous acidic solution and the silicate to form a gel.

In another embodiment the gel creates an impermeable filter cake layer that seals the face of the formation where the gel contacts the formation.

In another embodiment the infiltration volume of the drilling system into the formation during drilling operations is zero.

In another embodiment the aqueous acidic solution is a gelled acid comprising HCl.

In another embodiment the hydrocarbon-based isolation fluid is an emulsified diesel fluid.

In another embodiment the drilling system is used in a method for drilling a well into a hydrocarbon producing formation with zero-invasion.

In another embodiment the aqueous acidic solution and the silicate are delayed from interacting with one another until the emulsion is broken.

In another embodiment the silicate and the aqueous acidic solution form a gel. In another embodiment the filter layer cake is created in an amount effective to overcome exerted pressure during pumping of the drilling fluid.

In another embodiment the acidic drilling fluid system forms a sealing layer only on the face of the formation.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
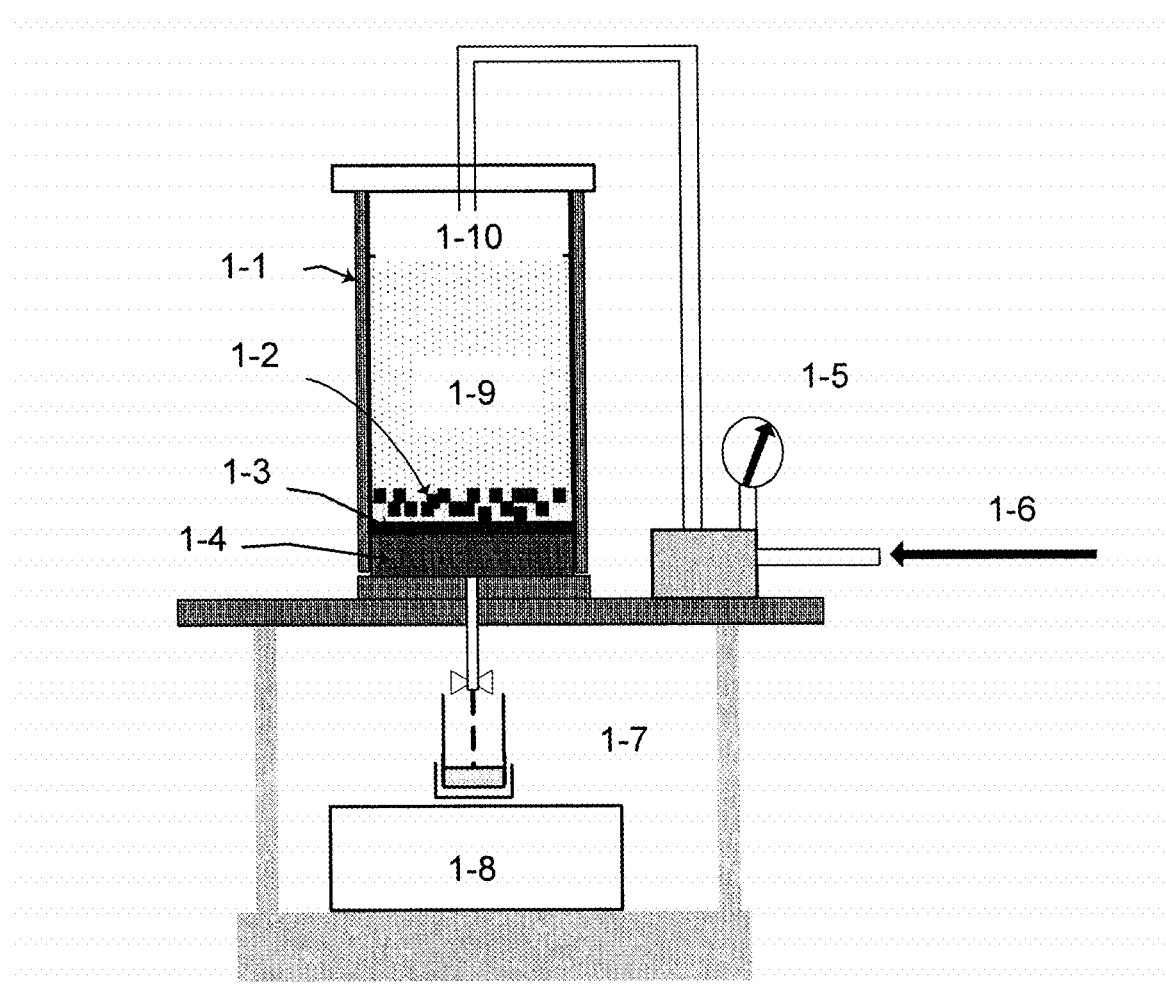
FIG. 1 illustrates a high pressure and high temperature filter press fluid loss test apparatus that tests the drilling fluid system.

Referring now to the drawings, wherein like reference numerals designate identical or corresponding parts throughout the several views.

One embodiment of the disclosure includes a drilling fluid system comprising an aqueous acidic solution, a silicate, and a hydrocarbon-based isolation fluid, polymer, or viscoelastic surfactant (VES). The aqueous acidic solution may comprise any acid including but not limited to HCl, HBr, HI, HF, $H_2SO_4$, or $HClO_4$. Organic acids such as formic acid, acetic acid and priopionic acid may also be used, alone or in combination with one or more inorganic acids.

In one embodiment the viscoelastic surfactant is comprised of an aqueous medium, an effective amount of an inorganic water soluble salt, and an effective amount of at least one surfactant selected from the group consisting of an anionic surfactant, a nonionic surfactant, and a hydrotropic surfactant and one or more hydrophobic organic alcohol. The anionic surfactant may be selected from compounds including but not limited to alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated or propoxylated sulfated dodecyl phenols. The anionic surfactant may be selected from compounds including but not limited to alkyl sulfates and alpha olefin sulfates, dodecylbenzene sulfonic acid, linear and branched alkyl benzene sulfonates, dodecylbenzene sulfonic acid, and linear and branched alkyl benzene sulfonates. The nonionic surfactant is selected from compounds including but not limited to ethoxylated octyl phenols, polypropylene glycols, ethoxylated linear alcohols, and ethoxylated nonyl phenols. The hydrotropic surfactant is selected from compounds including but not limited to dicarboxylic acids, phosphate esters, sodium xylene sulfonate, and sodium dodecyl diphenyl ether disulfonate. The hydrophobic organic alcohol is selected from compounds including but not limited to ethanol, diethanol, and propanol alcohol ethers, ethylbenzyl alcohol, 2-propanol, 2-ethyl-1-hexanol, 1-octanol, and 2-octanol, and mixtures thereof.

A polymer may be used together or separately from the viscoelastic surfactant. Examples of polymers that may be used in the drilling fluid system include polyacrylamide, partially hydrolyzed polyacrylamide, polyurethane, polybutylene and other polyalpha-olefins, and polyvinyl chloride.

The use of viscoelastic surfactants and/or polymers may impart properties to the drilling fluid system such as an increase in strain on application of constant stress; decreased stress on application of constant strain (e.g., the drilling fluid system may exhibit relaxing or sagging); cyclic loading may function to dissipate mechanical energy; frictional resistance can occur if the drilling fluid system is cycled. The inclusion of a viscoelastic surfactant and/or polymer provides a viscous material that can undergo changes in strength or resistance under load.

The hydrocarbon-based isolation fluid is preferably diesel fuel. The diesel fuel may be any of fractional distillate of petroleum, fuel oil, biodiesel, biomass to liquid (BTL) fuel or gas to liquid (GTL) diesel. The diesel may be produced from the fractional distillation of crude oil at temperatures between 200° C. and 350° C. The hydrocarbon materials preferably represent a mixture of hydrocarbons having between 8 and 21 carbon atoms per molecule although small amounts of higher carbon number materials may be present. Other hydrocarbons such as more highly purified petroleum distillates may be used.

In one embodiment the drilling fluid system comprises a gelled acid. The gelled acid may comprise 10% acid and 90% gel, 20% acid and 80% gel, 30% acid and 70% gel, 40% acid and 60% gel, 50% acid and 50% gel, 90% acid and 10% gel, 80% acid and 20% gel, 70% acid and 30% gel, or 60% acid and 40% gel. The gelled acid may be a visceoelastic surfactant based gel and/or a polymer based gel. The gelled acid comprises HCl or any other acid including but not limited to HBr, HI, or HF, or the acid that may otherwise be in the aqueous acidic solution. Preferably about 15% gelled acid is used in the drilling fluid system.

In another embodiment the drilling fluid system comprises an emulsified acid. The emulsified acid may be a diesel based solution although the organic portion of the emulsion may be any hydrocarbon based fluid including other petroleum derived distillates. The emulsified acid may comprise 10% acid and 90% diesel, 20% acid and 80% diesel, 30% acid and 70% diesel, 40% acid and 60% diesel, 50% acid and 50% diesel, 90% acid and 10% diesel, 80% acid and 20% diesel, 70% acid and 30% diesel, or 60% acid and 40% diesel. The emulsified acid is used to drill carbonate formations such as calcite and dolomite. Preferably about 15% emulsified acid is used in the drilling fluid system.

In another embodiment foamed acid may be used in low abnormal pressure carbonate reservoirs in place of gelled acid or emulsified acid. In another embodiment the foamed acid comprises an aqueous based fluid, an inert gas, and a blend of at least one alkyltrimethylammmonium chloride and an amine oxide selected from the group consisting of bis(2-hydroxyetyl) cocoamine oxide, dimethylhexadecylamine oxide, and dimethyl-hydrogenated tallowamine oxide. Preferably the one alkyltrimethylammmonium chloride is cocotrimethyl ammonium chloride. Preferably the amine oxide is bis(2-hydroxyethyl) cocoamine oxide. The blend is preferably present in an amount effective to impart foaming properties to the aqueous based fluid. Preferably the aqueous based fluid is a brine composition.

In other embodiments the foamed acid is an organic or inorganic acid that is foamed with a foaming agent such as carbon dioxide or an inert gas, preferably carbon dioxide. Inorganic acids include $H_2SO_3$, HCl, HI, HBr, HF, $HNO_3$, $H_2C_2O_4$, $H_3PO_4$, $H_3PO_2$, $HIO_4$, $H_2CO_3$, $H_2SiF_6$, $HMnO_4$, $H_2SO_4$, $HClO_4$, HClO, $H_2CO_3$, $H_3BO_3$, and $H_2Cr_2O_7$. Organic acids include Citric Acid, Formic Acid, Malonic Acid, Tartartic Acid, Glutamic Acid, Phthalic Acid, Azelaic Acid, Barbituric Acid, Benzilic Acid, Cinnamic Acid, Fumaric Acid, Glutaric Acid, Gluconic Acid, Hexanoic Acid, Lactic Acid, Malic Acid, Oleic Acid, Folic Acid, Propiolic Acid, Propionic Acid, Stearic Acid, Tannic Acid, Trifluoroacetic Acid, Uric Acid, Ascorbic Acid, Gallic Acid, and Acetic Acid. The foamed acid, or other acid present in the drilling fluid system may also act as an inhibitor or function in combination with the acid.

Inhibitors include amines, hydrazines, including hexamine, phenylenediamine, and dimethylethanolamine; sulfite, ascorbic acid, benzotriazole, zinc dithiophosphates, zinc phosphate, tannic acid, zinc salts of organonitrogens, benzalkonium chloride.

In another embodiment the silicate composition includes a sealing material, e.g., a silicate composition, including but not limited to sodium silicate, cesium silicate, potassium silicate, lithium silicate, and rubidium silicate. The sealing material functions by interacting with an acid to form a dense precipitate or highly viscous material. Preferably the silicate composition is sodium silicate. The silicate composition has a density in the range of 2.0-3.5 $g/cm^3$, 2.1-3.0 $g/cm^3$, or 2.5-2.9 $g/cm^3$. Preferably the silicate composition has a density of 2.7 $g/cm^3$. The silicate composition is added to the drilling fluid system in an amount to effective to form a seal on the face of a well bore and thereby produce the pressure necessary to carry out drilling operations, pre- or post-production. The silicate composition may be present in the drilling fluid system in an amount by weight based on the total weight of the drilling system in the range of 1-50%, 2-40%, or 3-30%. Preferably the silicate composition is added in the range of 5-15%.

The present invention includes a drilling fluid system using a retarded HCl acid system that contains a diesel (emulsified acid) or gelled acid (viscoelastic (VES) surfactant based or polymer based). The weighting materials added to the drilling fluid system includes the sodium silicate that to give an effective drilling fluid weight and to prevent the invasion of the mud filtrate into the formation. Comparable to the conventional weighting material Calcium Carbonate (e.g. density=2.7) the low density of the silicate composition (e.g. density=2.7) can be compensated by using sodium formate as an aqueous phase of the drilling fluid, and/or by adding a little bit from the solution. Cesium, potassium, or sodium formate can also be used for this purpose.

The drilling fluid system dissolves generated cuttings downhole thereby reducing and/or eliminating the need to raise cuttings to the surface. The drilling fluid system can be used to drill the target hydrocarbon producing formation with zero-invasion with enhanced and controlled fluid loss.

The drilling fluid system includes an aqueous acid solution, a silicate, and a hydrocarbon-based isolation fluid, polymer, or VES. The aqueous acid solution, silicate and hydrocarbon-based isolation fluid form an emulsion such that the aqueous acid solution and silicate are substantially delayed from interacting with each other to form a gel until the emulsion is broken. The emulsion is broken by contact with the rock of a hydrocarbon producing formation, e.g., the face of a well bore. The breaking of the emulsion initiates the interaction between the aqueous acid solution and the silicate such that a gel is formed. The gel functions to seal the formations at the face of the well bore and create a tight impermeable filter cake layer. The impermeable layer does not penetrate inside the formation. This allows for control of fluid loss and completely prevents mud filtrate invasion into the formation. This impermeable layer can be removed later as described below. In turn, no stimulation process is required after drilling the formation with such drilling fluid system.

Different types of additives can be used in the new drilling fluid system, especially for carbonate reservoirs. These additives include corrosion inhibitors, polymers, surfactants, and emulsifiers.

The method of using the drilling fluid system also controls the formation pressure and cleaning of the well bore. Therefor the percentage of sodium silicate used in this drilling fluid system, as weighting material to produce the required pressure with a percentage range of 5% to 15%, will depend on the depth (TVD—total vertical depth) of the target hydrocarbon formation drilling for the formation with the same permeability. In case of the permeability variation, 5% silicate is adequate for a permeability range of 1 md to 100 md (millidarcy), whereas 100 md to 300 md may require 10% of silicate to generate an effective filter cake and 15% is desired for higher range of permeabilities (from 300 md to 500 md). This is due to the fact that the increase in permeability requires an extra amount of silicate in order to be able to produce an effective barrier over the face of the target hydrocarbon formation.

In accordance with another embodiment of the disclosure, the mineralogy of the drilled formation is a significant factor involved in determining the proportion of the acid in the drilling fluid system. In particular, there is provided a two mineral composition (dolomite and calcite), in accordance with an embodiment of the disclosure, for use in determining the acid proportion present in a target production zone. Acid in an amount of about 15% by weight can be used in the this drilling fluid system if the target drilled formation is calcite to be drilled in less time. In the case of dolomite the acid concentration should be raised to achieve the same drilling rate as pure calcite because dolomite has lower reaction rate with the acid compared to calcite. The acid concentration should be determined earlier based on the reservoir section mineralogy (% calcite and % dolomite).

API static filtration tests were used to indicate filter cake quality and filtration volume loss for a drilling fluid system using acid emulsion fluid under specific testing conditions. The tests show the ability of the acid emulsion drilling fluid system to form an effective thin and impermeable filter cake layer and to sustain high differential pressure without invading through the core and to overcome pressure exerted during pumping the drilling fluids. The static loss test is carried out under high pressure of 1 and 1500 psi. The tests were performed using 500 ml HPHT cell, FIG. 1.

FIG. 1 is an illustration of an assembled high pressure high temperature filtration cell. A heating jacket 1-1 allows the filtration cell to stay warm and keeps the filtration cell at an appropriate temperature. Drilling cuttings 1-2 and a drilling fluid 1-9 help to form a filter layer cake 1-3. A filter media 1-4 is formed underneath the filter layer cake 1-3. Compressed air 1-6 enters the system and a flow of air 1-10 enters the filtration cell to help form the filter layer cake 1-3. The compressed air 1-6 is measured by a pressure gauge 1-5 so that an effective amount of compressed air enters the filtration cell. A filtration apparatus 1-7 is located from the filter media 1-4 and a digital balance 1-8 measures the amount of filtered product.

Figure 2:
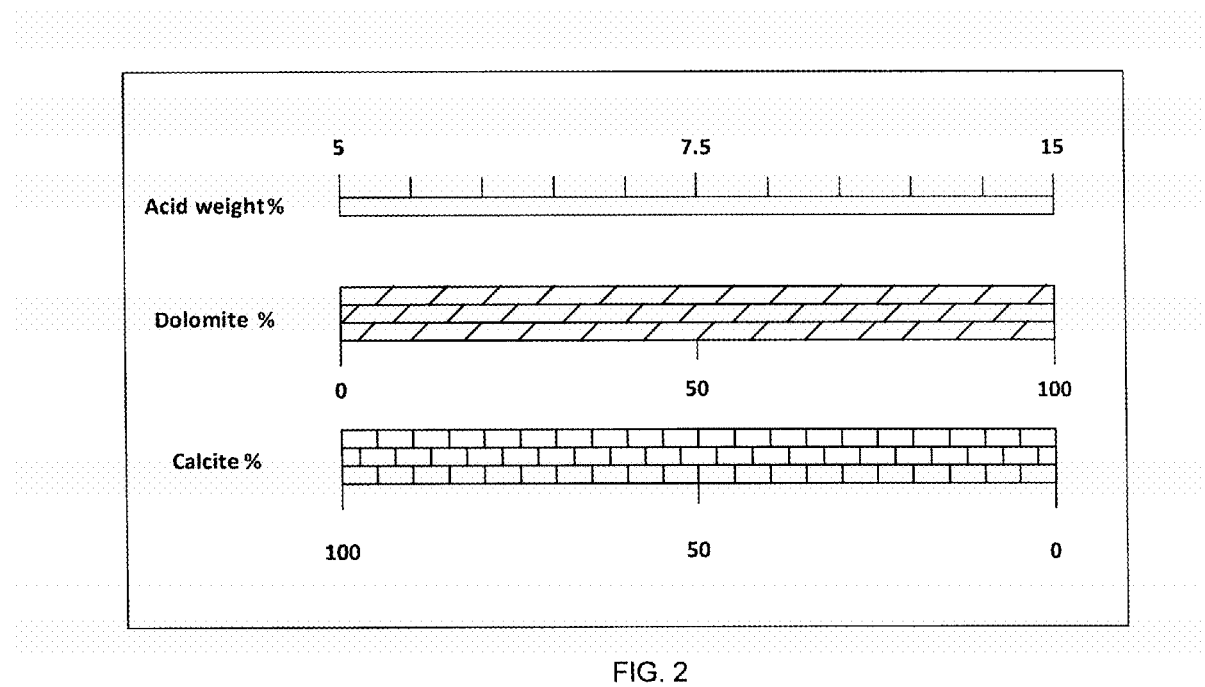
FIG. 2 is a graph that determines the acid amount weight percentage based on the mineralogy of the drilled formation.

FIG. 2 is a graph that determines the acid amount weight percentage based on the mineralogy of the drilled formation.

Figure 3:
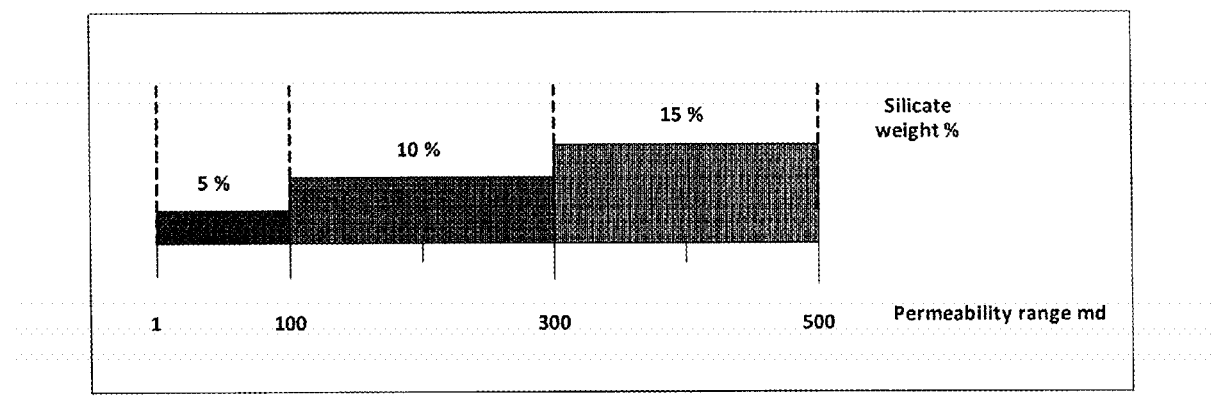
FIG. 3 is a graph that shows the determination of the adequate quantity of silicate weight percentage to generate an effective filter cake over the face of the permeable formation based on the permeability range.

FIG. 3 shows the determination of the adequate quantity of silicate weight percentage to generate an effective filter cake over the face of the permeable formation based on its permeability range.

Indiana limestone rock samples were used as filtration medium in the test to simulate the field drilling operation. The rock sample diameter was 2.5 inch and the thickness was 0.25 inch with and average permeability valid from 1 md to 500 md.

To consider the effect of the drilling cuttings that are, if not properly removed with solid control equipment, mixing with the drilling fluid during circulation the drilling fluid; 15 to 10% weight percentage of the small drilling cuttings of Indiana limestone rock were added to the cell of the test to match the real well bore condition.

The various compositions of the described drilling fluid system are then placed above the upper face of the core sample in the HPHT cell and pressure was applied by nitrogen above the composition.

It was a demonstrated that the filter cake formed over the upper face of the core sample almost has about 1 mml thickness and sustains high differential pressure with zero infiltration volume. The formed filter cake also can be destructed by using mixture of HCl and mutual solvent.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method of drilling a well present in a hydrocarbon producing formation, comprising:
    drilling a hydrocarbon producing carbonate rock formation with a drilling fluid system to form the well in the hydrocarbon producing carbonate rock formation, wherein the drilling forms carbonate rock cuttings which are suspended in the drilling fluid system,
    contacting a face of the well with the drilling fluid system comprising the carbonate rock cuttings,
    wherein the drilling fluid system further comprises:
        an aqueous acidic solution;
        a silicate; and
        a hydrocarbon-based isolation fluid;
        wherein the aqueous acidic solution, the silicate and the hydrocarbon-based isolation fluid are in the form of an emulsion;
    wherein during the drilling the emulsion breaks when contacted with the hydrocarbon producing formation to initiate interaction of the aqueous acidic solution and the silicate to form a gel and thereby form an impermeable filter cake layer on the face of the well in the hydrocarbon producing formation,
    wherein, during the drilling, the concentration of the silicate in the drilling fluid system is effective to form an impermeable filter cake layer on the face of the well and has a silicate concentration of: 5 weight % when the hydrocarbon producing carbonate rock formation has a permeability of between 1 to 100 md, 10 weight % when the hydrocarbon producing carbonate rock formation has a permeability of between 100 to 300 md, or 15 weight % when the hydrocarbon producing carbonate rock formation has a permeability of between 300 to 500 md,
    wherein the filter cake layer formed on the face of the well in the hydrocarbon producing formation comprises the carbonate rock cuttings, and
    wherein the filter cake layer is formed only on the face of the well, has a thickness of about 1 mm, and has zero infiltration volume.

2. The method of claim 1, further comprising delaying interaction of the aqueous acidic solution and the silicate until the emulsion is broken.

3. The method of claim 1, wherein the filter cake layer is formed in an amount effective to overcome exerted pressure during pumping of the drilling fluid system.

4. The method of claim 1, wherein the aqueous acidic solution comprises an emulsified acid or a gelled acid, and the emulsified acid is diesel and the gelled acid is a viscoelastic surfactant based gelled acid or a polymer based gelled acid.

* * * * *